Figure 1:
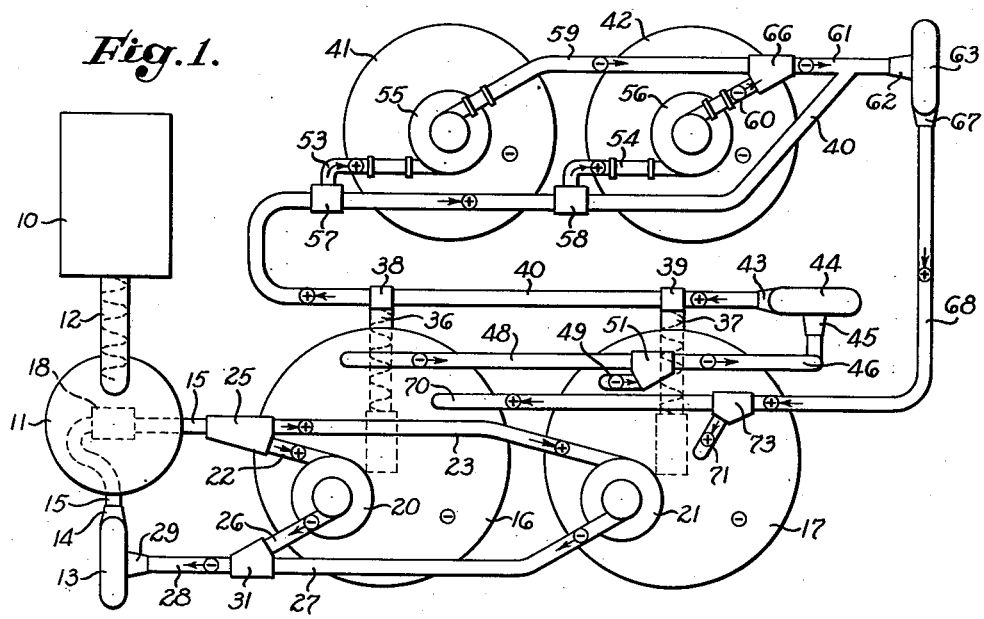

Oct. 22, 1957 — H. E. TEMPLE — 2,810,609
PNEUMATIC CONVEYOR SYSTEM
Filed Oct. 13, 1952

INVENTOR.
HIRAM E. TEMPLE
BY HIS ATTORNEYS.
HARRIS, KIECH, FOSTER & HARRIS

United States Patent Office 2,810,609
Patented Oct. 22, 1957

2,810,609

PNEUMATIC CONVEYOR SYSTEM

Hiram E. Temple, York, Pa., assignor, by mesne assignments, to Capital Products Corporation, a corporation of Pennsylvania Application October 13, 1952, Serial No. 314,472

2 Claims. (Cl. 302—3)

The present invention relates in general to conveyor systems for pulverulent materials, such as flour, for example, and, more particularly, to a pneumatic conveyor system for such materials, a primary object of the invention being to provide a conveyor system which is substantially dust free in operation.

Pressure conveyor systems have been used extensively in bakeries for transporting flour from one to another of such elements as dump bins, sifters, storage bins, scale hoppers, mixers, and the like, but have not been entirely satisfactory because of the excessive quantities of dust resulting from small leaks in the system, particularly around the dump valves utilized in scale hoppers and around the connections between scale hoppers and mixers. A primary object of the present invention is to eliminate, or substantially eliminate, such leakage and thereby eliminate the resulting dust, which is a health and fire hazard, as well as being a general nuisance.

More particularly, an important object of the present invention is to provide a pneumatic conveyor system which maintains those elements of the system which are likely to leak at subatmospheric pressure so that any leakage which may occur is inward, rather than outward, which is an important feature of the invention.

Another object is to provide a pneumatic conveyor system which includes a scale hopper, or other receptacle, for the flour, an inlet duct connected to the receptacle to convey the flour thereinto, an exhaust duct connected to the receptacle, a blower having its discharge side connected to the inlet duct to convey the flour therethrough and to maintain the inlet duct at superatmospheric pressure, and a blower having its intake side connected to the exhaust duct to maintain the exhaust duct and the scale hopper at subatmospheric pressure, whereby all air movement through any openings in and about the scale hopper is inward, rather than outward, to prevent the escape of flour and the resulting dust.

Another object is to provide means for maintaining the discharge conduit of the scale hopper below the dump valve at subatmospheric pressure so as to prevent the escape of flour through any openings which may be present in the discharge conduit, or in its connections to some other apparatus, such as a mixer, for example.

An important object of the invention is to provide a pneumatic conveyor system of the foregoing character which is completely closed so that all flour drawn off through the exhaust duct or ducts is returned to some element of the system, thereby avoiding the loss of any flour from the system, which is an important feature.

Figure 2:
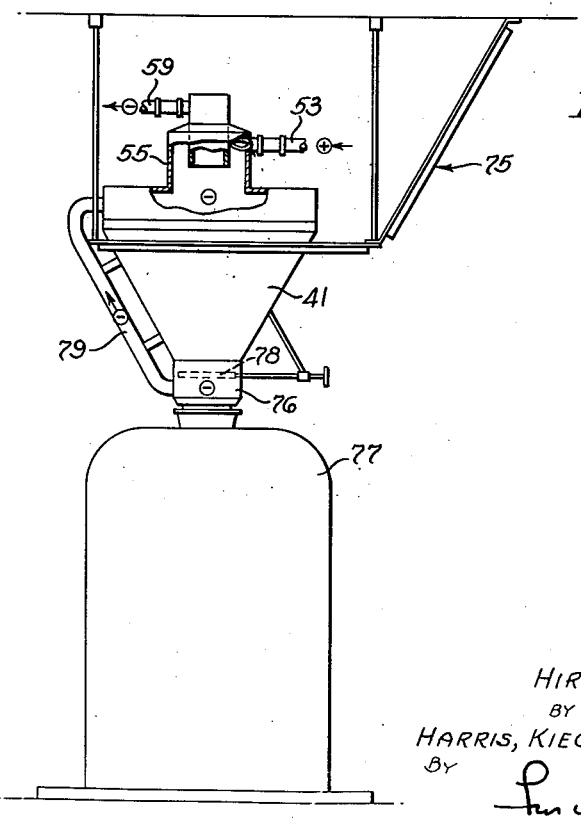

The foregoing objects and advantages of the present invention, together with various other objects and advantages thereof which will become apparent, may be attained with the exemplary embodiment of the invention which is illustrated in the accompanying drawing and which is described in detail hereinafter. Referring to the drawing, which is illustrative only:

Fig. 1 is a diagrammatic plan view of a pneumatic conveyor system which embodies the invention; and Fig. 2 is a diagrammatic elevational view, partially in section, illustrating a portion of the pneumatic conveyor system of Fig. 1.

Referring to the drawing, flour dumped into a supply bin or hopper 10 is delivered to a sifter 11 in any suitable manner, as by a screw conveyor 12. A blower 13 has connected to its discharge side 14 an inlet duct 15 for storage bins 16 and 17, two storage bins being shown, although this number may be increased or decreased as desired. Disposed in the line of the inlet duct 15 is a rotary valve 18 which communicates with the sifter 11 and which delivers flour to the inlet duct. The rotary valve 18 may be of any suitable type and may be one of those disclosed and claimed in my copending application Serial No. 291,896, filed June 5, 1952, now Patent No. 2,757,049, July 7, 1956.

Mounted on top of and communicating with the interiors of the respective storage bins 16 and 17 are centrifugal collectors which may be ordinary cyclone separators 20 and 21. The inlet duct 15 is provided with branches 22 and 23 which communicate tangentially with the separators 20 and 21 at the peripheries thereof in the conventional manner, the branches 22 and 23 having a diversion valve 25 at their junction to divert flour into the bin 16 or the bin 17 as desired. Connected to the separators 20 and 21 centrally thereof are branches 26 and 27 of an exhaust duct 28 which is connected to the intake side 29 of the blower 13, the junction of the branches 26 and 27 having a diversion valve 31 thereat.

Flour is discharged from the respective storage bins 16 and 17 by screw conveyors 36 and 37 which, in turn, discharge into rotary valves 38 and 39 in an inlet duct 40 leading to scale hoppers 41 and 42, the upstream end of the inlet duct 40 being connected to the discharge side 43 of a blower 44. In the particular construction illustrated, the intake side 45 of the blower 44 is connected to an exhaust duct 46 for the storage bins 16 and 17, the exhaust duct 46 having branches 48 and 49 which respectively communicate with the storage bins 16 and 17 and which are controlled by a diversion valve 51 at their junction. However, the intake side 45 of the blower 44 may communicate with the atmosphere if desired.

The inlet duct 40 leading to the scale hoppers 41 and 42 has branches 53 and 54 which communicate tangentially with the peripheries of cyclone separators 55 and 56, respectively, the latter being mounted on and communicating with the scale hoppers 41 and 42, respectively. The branches 53 and 54 of the inlet duct 40 are controlled by diversion valves 57 and 58, respectively, these valves being located at the junctions of the duct 40 with the respective branches 53 and 54. Connected to and communicating centrally with the respective separators 55 and 56 are branches 59 and 60 of an exhaust duct 61 which is connected to the intake side 62 of a blower 63, the branches 59 and 60 being controlled by a diversion valve 66 at their junction. The inlet duct 40 to the hoppers 41 and 42 communicates with the exhaust duct 61 to permit cleaning out the duct 40 when desired.

The discharge side 67 of the blower 63 communicates with a duct 68 which is provided with branches 70 and 71 respectively communicating with the storage bins 16 and 17 through a diversion valve 73 at the junction of the branches.

Considering the scale hoppers 41 and 42 in more detail, the details of the scale hopper 41 are shown in Fig. 2 of the drawings, the scale hopper 42 being similar and not being illustrated in detail. The scale hopper 41 is supported by a framework 75 and is suitably connected to a scale beam, or the like, not shown, for weighing purposes. At its lower end, the scale hopper 41 is provided with a discharge conduit 76 which communicates with a mixer 77, or other apparatus. The discharge of flour from the scale hoper 41 is controlled by a dump valve 78. Preferably, an exhaust duct 79 connects the discharge conduit 76 below the dump valve 78 to the upper end of the scale hopper 41.

Considering the manner in which the various valves control the flow of flour throughout the system, if it is desired to deliver flour from the sifter 11 to the storage bin 16, it is necessary to set the valve 25 so that it connects with the bin 16 to set the valve 31 so that it also communicates with this bin. Similarly, if it is desired to deliver flour from the sifter 11 to the storage bin 17, it is necessary to set the valve 25 to communicate with the bin 17 and to set the valve 31 to communicate with this bin. If desired, these valves may be ganged together for simultaneous operation in any suitable manner. Alternatively, if it is desired to deliver flour to both of the storage bins 16 and 17 at the same time, the valves 25 and 31 may be set in intermediate positions.

Whenever it is desired to deliver flour to the scale hopper 41 only, it is necessary for the diversion valves 57 and 66 to be suitably set. Conversely, if it is desired to deliver flour to the scale hopper 42 only, it is necessary for the settings of the valves 57 and 66 to be reversed and for the valve 58 to be set to connect with the hopper 42. The valve 58 is set to communicate directly with the blower 63 only when it is desired to secure maximum air flow through the inlet duct 40 for cleanout purposes.

Whenever flour is being drawn from the storage bin 16 only, the valves 51 and 73 are set to communicate with this bin, the reverse being the case when flour is being drawn from the storage bin 17 only. If flour is being drawn from both of the storage bins, the valves 51 and 73 are set in intermediate positions.

As hereinbefore discussed in the section of this specification relating to the objects of the present invention, a primary object of the invention is to substantially eliminate dust by subjecting those portions of the pneumatic conveyor system which are likely to have leaks therein to subatmospheric pressure so that any leakage is inward, rather than outward. In other words, the various flour receptacles in the system which are subject to leakage are maintained at subatmospheric pressure so that air is continuously drawn thereinto through the leaks, whereby no flour can escape through the leaks to produce dust in the atmosphere surrounding the apparatus, which is an extremely important feature.

For convenience in considering the pressures and flows throughout the pneumatic conveyor system, the following symbols have been applied to the drawing: (+) (−). Whenever the pressure in a particular duct, receptacle, or the like is superatmospheric, the symbol (+) has been applied and wherever the pressure is subatmospheric, the symbol (−) has been applied. Arrows have been applied to the various ducts or conduits to indicate the directions of flow through the system.

It will be apparent that, because of the fact that the interiors of the receptacles or scale hoppers 41 and 42 are connected directly to the intake side 62 of the blower 63 through the exhaust duct 61 and its branches 59 and 60, the interiors of the scale hoppers 41 and 42 are maintained at subatmospheric pressure. In addition, because of the presence of the bypass conduit 79, that portion of the discharge conduit of the scale hopper 41 which is located below the dump valve 78 is maintained at subatmospheric pressure, a similar construction preferably being employed in connection with the scale hopper 42. Thus, any leaks in the scale hoppers 41 and 42 are subjected to inward flow of air therethrough to prevent the escape of dust. This is particularly important in the discharge conduit 76 and its connection to the mixer 77, such connection necessarily being flexible to permit movement of the scale hopper 41 for weighing purposes, and thus being difficult to maintain airtight. Similar considerations are applicable to the storage bins 16 and 17 which are also maintained at subatmospheric pressure.

Thus, only the inlet ducts leading to the storage bins 16 and 17 and to the scale hoppers 41 and 42 are maintained at superatmospheric pressures, the various exhaust ducts and the various receptacles in the system being maintained at subatmospheric pressures. The inlet ducts are relatively easily maintained airtight so that leakage therefrom is no particular problem. However, by maintaining the receptacles in the system at subatmospheric pressures, it is not necessary to maintain them airtight since any leakage does not result in the escape of flour into the atmosphere, which is an important feature. Thus, the present invention permits the use of a pressure pneumatic system for actual flour conveyance, which has many advantages, while avoiding the dust problems encountered with prior pressure pneumatic systems, which is an extremely important feature of the invention.

Another feature of the invention is that the pneumatic conveyor system is completely closed, i. e., the blowers connected to the various exhaust ducts for maintaining the receptacles under subatmospheric pressure discharge into the storage bins 16 and 17. Thus, any flour which may be drawn off by the blowers in maintaining the receptacles under subatmospheric pressure is returned to the storage bins, wherein it settles out.

While I have disclosed in diagrammatic form an exemplary embodiment of the invention, it will be understood that such embodiment is illustrative only and that the invention may be incorporated in numerous other embodiments without departing from the spirit thereof.

I claim as my invention:

1. In a pneumatic conveyor system for a material such as flour, the combination of: a storage bin; a scale hopper; an inlet duct connected to said scale hopper; means for delivering material from said storage bin to said inlet duct; a first blower having its discharge side connected to said inlet duct so as to convey material therethrough into said scale hopper and to maintain said inlet duct at superatmospheric pressure; a duct connecting the intake side of said first blower with said storage bin to effect a reduction of pressure in said storage bin; an exhaust duct connected to said scale hopper; a second blower having its intake side connected to said exhaust duct to maintain said exhaust duct and said scale hopper at subatmospheric pressure; and a duct providing communication between the discharge side of said second blower and said storage bin.

2. In a pneumatic conveyor system for a material such as flour, the combination of: a storage bin; a scale hopper; an inlet duct connected to said scale hopper; means for delivering material from said storage bin to said inlet duct; a first blower having its discharge side connected to said inlet duct so as to convey material therethrough into said scale hopper and to maintain said inlet duct as superatmospheric pressure; an exhaust duct connected to said scale hopper; a second blower having its intake side connected to said exhaust duct to maintain said exhaust duct and said scale hopper at subatmospheric pressure; a duct providing communication between the discharge side of said second blower and said storage bin; a sifter; a second inlet duct connected at its upstream end to said sifter and at its downstream end to said storage bin; a second exhaust duct connected at its upstream end to said storage bin and at its downstream end to said sifter; and blower means in at least one of the ducts which are connected to said sifter for maintaining said second inlet duct at superatmospheric pressure and for maintaining said storage bin and said second exhaust duct at subatmospheric pressure.

(References on following page)

References Cited in the file of this patent

UNITED STATES PATENTS

| | | |
|---|---|---|
| 1,052,381 | Reinhardt | Feb. 4, 1913 |
| 1,321,262 | Townsend | Nov. 11, 1919 |
| 2,234,788 | Williams | Mar. 11, 1941 |
| 2,539,109 | Webb | Jan. 23, 1951 |
| 2,572,862 | Israel | Oct. 30, 1951 |
| 2,688,517 | Riorden | Sept. 7, 1954 |
| 2,688,618 | Krenke | Sept. 7, 1954 |

FOREIGN PATENTS

| | | |
|---|---|---|
| 23,594 | Great Britain | Oct. 23, 1896 |
| 153,746 | Great Britain | Nov. 18, 1920 |
| 338,997 | Germany | Aug. 17, 1919 |